Patented Apr. 12, 1938

2,113,597

UNITED STATES PATENT OFFICE 2,113,597

AZO COMPOUNDS

Fritz Mietzsch and Josef Klarer, Wuppertal-Elberfeld, Germany, assignors to Winthrop Chemical Company, Inc., New York, N. Y., a corporation of New York No Drawing. Original application December 14, 1933, Serial No. 702,427. Divided and this application March 27, 1936, Serial No. 71,347. In Germany November 30, 1933

6 Claims. (Cl. 260—97)

This invention relates to azo compounds which are soluble in alkaline solution and display a bactericidal action, and to a process of preparing the same.

In accordance with the present invention alkali-soluble azo compounds displaying a bactericidal action are obtainable by the manufacture of the compounds of the general formula:

$$R_1—N=N—R_2,$$

wherein $R_1$ stands for a para-sulfamide or disulfamide substituted radical of the benzene series, and $R_2$ stands for a cyclic radical containing nitrogen in basic linkage, that is for an aminobenzene or aminonaphthalene radical which contains at least one hydroxyl group. In the new azo compounds the amino group of the sulfamide group may be a primary, secondary or tertiary amino group. It may, for instance, be substituted by saturated or unsaturated alkyl or cycloalkyl groups, such as methyl, ethyl, allyl, butyl, isoamyl, cyclohexenyl, or by aralkyl groups, such as benzyl and phenylethyl. The two hydrogen atoms of the amino group may also be replaced by an alkylene group in which case the nitrogen atom of the sulfamide group forms a hydrogenated heterocyclic ring system with the alkylene group, for instance, a pyrrolidyl or piperidyl ring. The new compounds may contain besides the above specified characteristic groups other substituents, such as alkyl, halogen, hydroxyl, alkoxy, phenoxy and the nitro group, but free acid groups should not be present. The amino groups attached to the one nucleus of the azo compounds may be substituted, for instance, by alkyl groups.

In accordance with the present invention the alkali-soluble azo compounds of the kind specified are obtainable by reacting upon an aminobenzene or aminonaphthalene compound which contains at least one hydroxyl group with a para-sulfamide or a disulfamide diazo compound of the benzene series, whereby the reacting components may be further substituted in the manner above indicated. The reaction is advantageously carried out in the presence of water at a low temperature, say at about 20° C. or below. The azo compounds thus obtainable are colored powders which are insoluble in water but form with mineral acids, such as hydrochloric, hydrobromic, sulfuric and alkyl sulfonic acids salts which dissolve more or less in water. Since the new azo compounds contain a phenolic hydroxyl group they dissolve also in caustic alkalies. In view of their remarkable bactericidal action the new compounds have proved active in the treatment of infectious diseases.

The invention is further illustrated by the following example without being restricted thereto:

*Example 1.*—20.8 grams of the hydrochloride of 4-amino-benzene-sulfonoamide are diazotized in hydrochloric acid solution by means of 6.9 grams of sodium nitrite. A solution of 10.9 grams of 3-aminophenol in excess caustic alkali lye is added to the diazo solution. The coupling reaction immediately takes place. From the red brown solution the 4'-sulfonoamide-2-amino-4-hydroxy-azo-benzene is obtained by means of acetic acid as a brown precipitate which, after precipitation from its aqueous solution in caustic soda lye by means of acetic acid, melts at 106° C.

When using instead of 3-aminophenol, 1.8-amino-naphthol in the above reaction, 4'-sulfonoamide-benzene-azo-4-hydroxy-5-amino-naphthalene is obtained in the form of a blackish-brown precipitate melting at 232° C. while decomposing. The new product dissolves in aqueous caustic soda solution with violet coloration.

If the coupling of the 4-sulfonoamide-diazobenzene with 3-aminophenol is performed in acid solution, the hydrochloride of the 4'-sulfonoamide-2-hydroxy-4-amino-azo-benzene is obtained as a brick red powder which is soluble in caustic soda lye with cherry red coloration melting at 228° C.

This is a division of our copending application for Letters Patent Serial No. 702,427, filed December 14, 1933.

We claim:—

1. Alkali-soluble azo compounds of the general formula:

$$R_1—N=N—R_2,$$

wherein $R_1$ stands for a cyclic radical selected from the group consisting of para-sulfamide and disulfamide substituted radicals of the benzene series, and $R_2$ stands for a cyclic radical containing nitrogen in basic linkage, which cyclic radical is selected from the group consisting of hydroxy-amino benzenes and the corresponding N-alkylated compounds, which azo compounds form water-soluble salts with mineral acids or caustic alkalies.

2. Alkali-soluble azo compounds of the general formula:

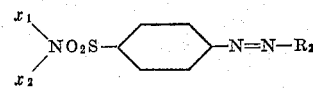

wherein $R_2$ stands for a cyclic radical selected from the group consisting of hydroxy-amino benzenes and the corresponding N-alkylated compounds, and $x_1$ and $x_2$ stand for hydrogen, which azo compounds form water-soluble salts with mineral acids or caustic alkalies.

3. Alkali-soluble azo compounds of the general formula:

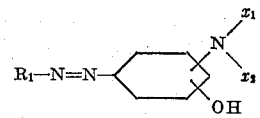

wherein $R_1$ stands for a cyclic radical selected from the group consisting of para-sulfamide and disulfamide substituted radicals of the benzene series, $x_1$ and $x_2$ stand for hydrogen, which azo compounds form water-soluble salts with mineral acids or caustic alkalies.

4. Alkali-soluble azo compounds of the general formula:

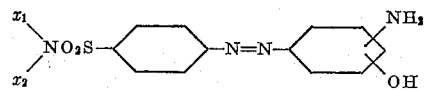

wherein $x_1$ and $x_2$ stand for hydrogen, which azo compounds form water-soluble salts with mineral acids or caustic alkalies.

5. The process which comprises reacting upon an amino-hydroxybenzene with a diazo compound selected from the group consisting of para-sulfamide and disulfamide diazo compounds of the benzene series.

6. The process which comprises reacting upon an amino-hydroxy benzene with a para-sulfamido benzene diazo compound.

FRITZ MIETZSCH.
JOSEF KLARER.